J. RETON.
HYDRAULIC TRANSMISSION MECHANISM.
APPLICATION FILED JULY 19, 1918.
1,343,749.
Patented June 15, 1920.
11 SHEETS—SHEET 8.
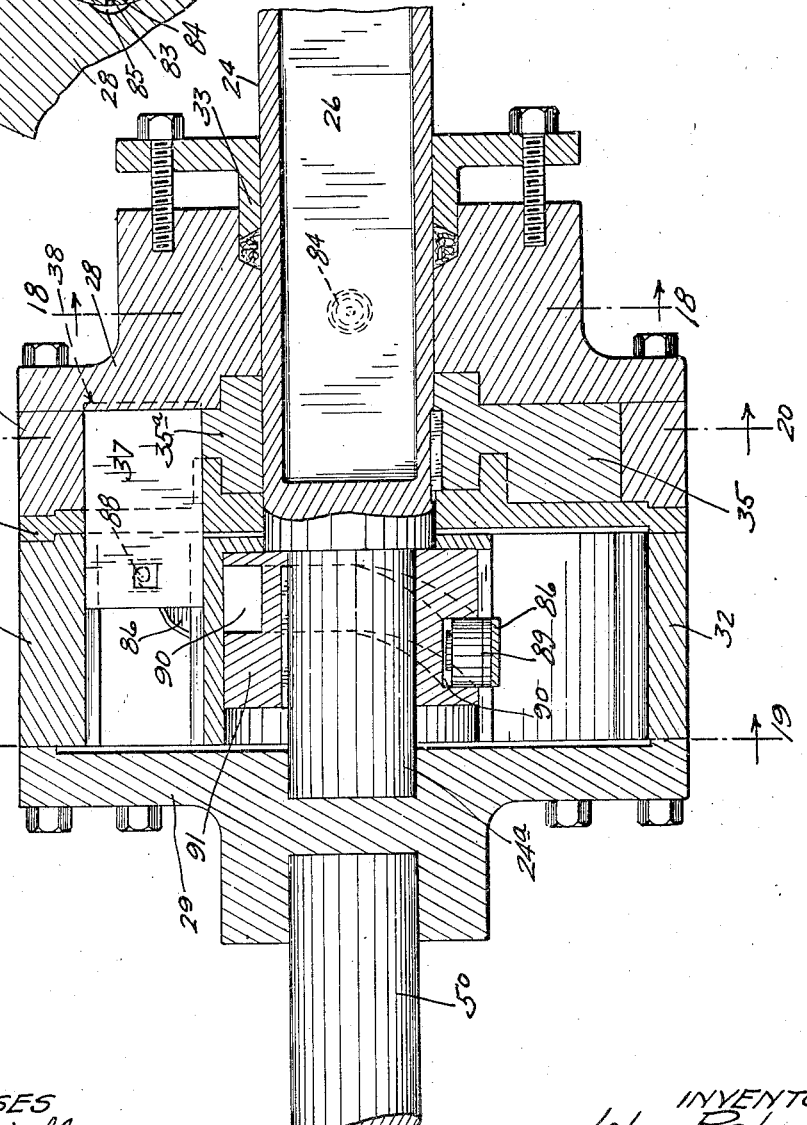

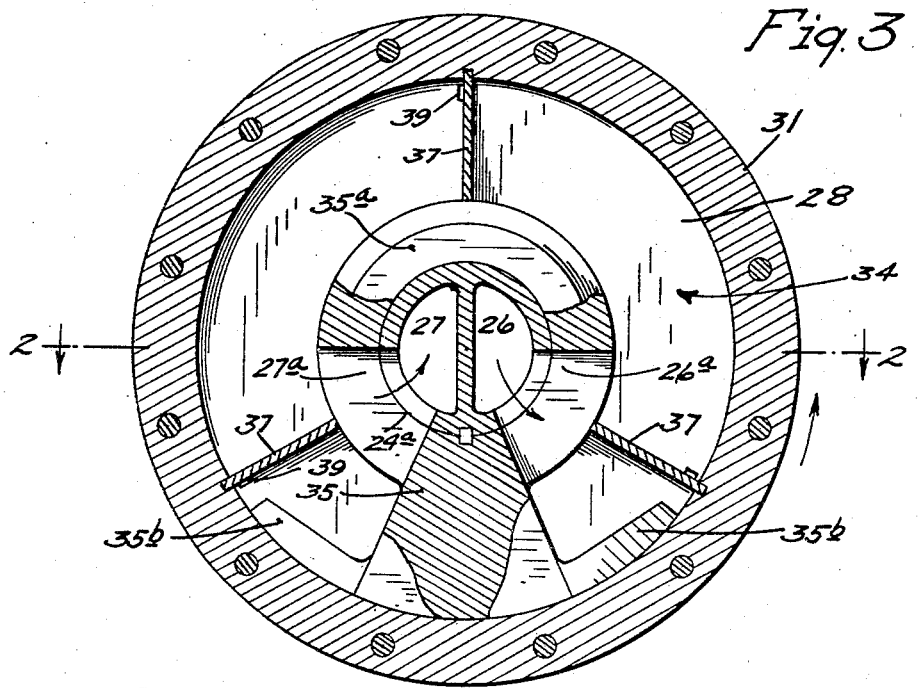
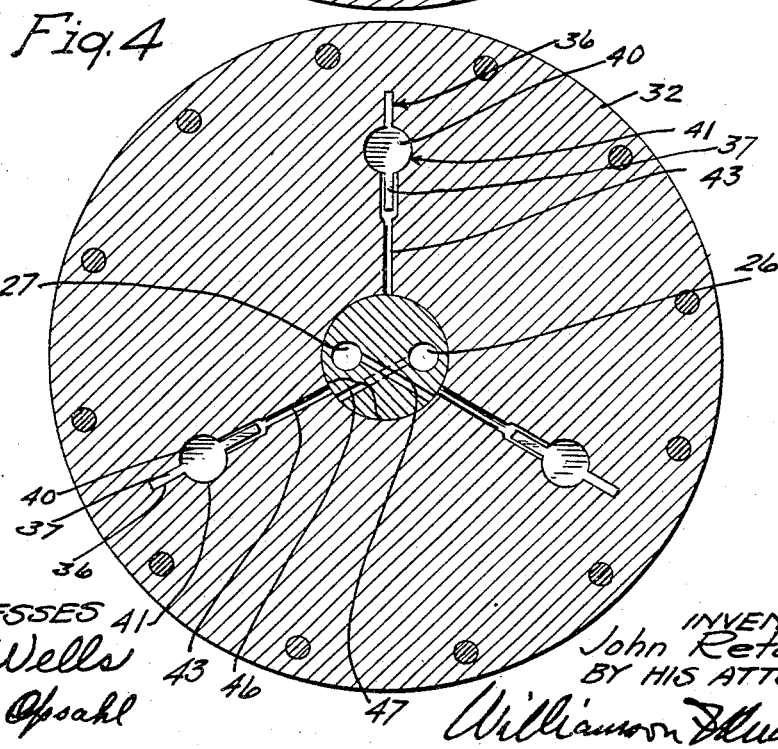

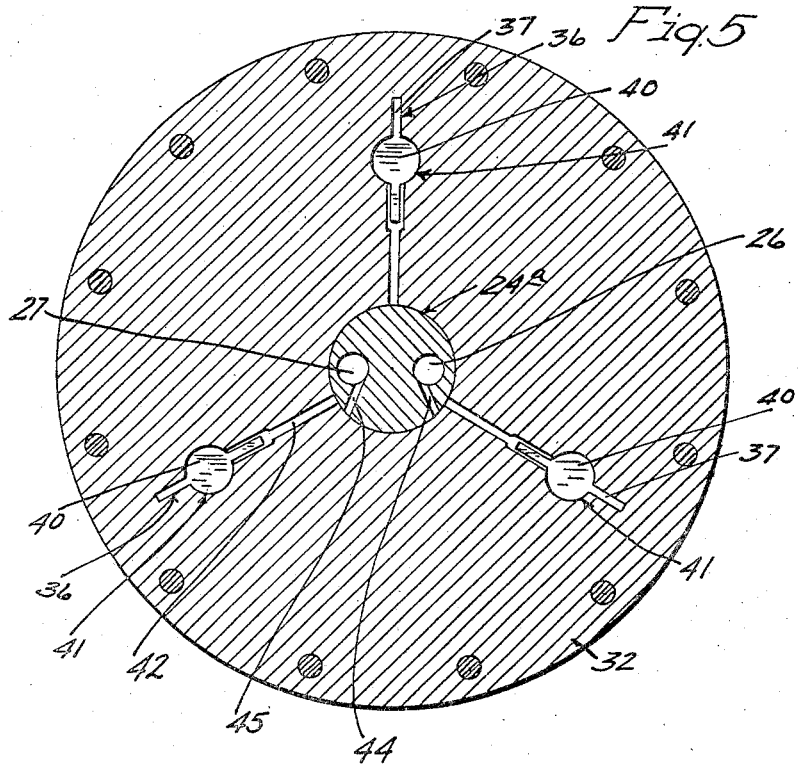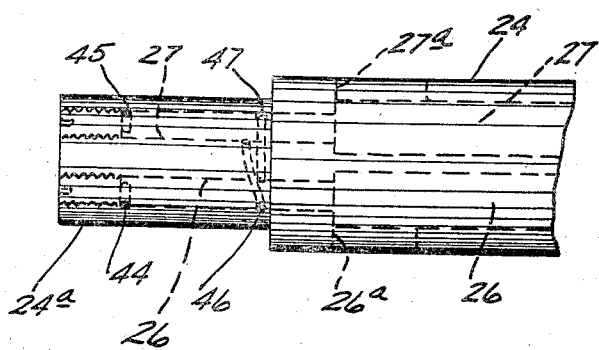

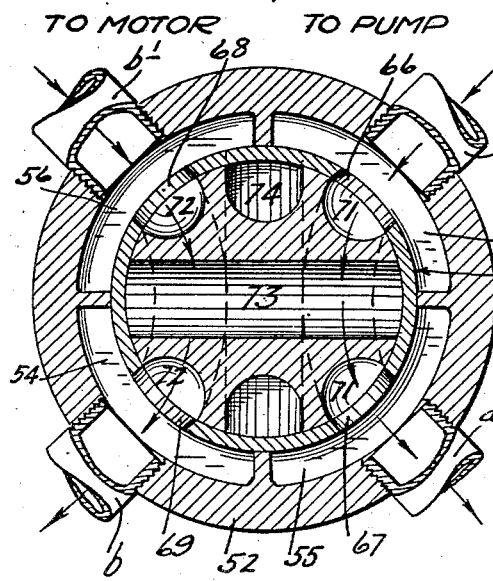
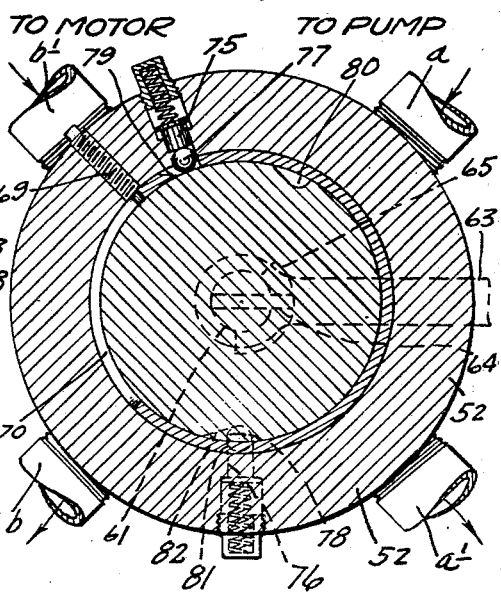
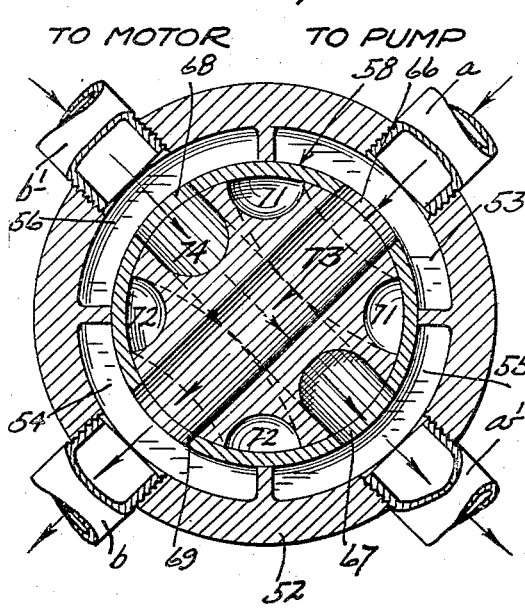
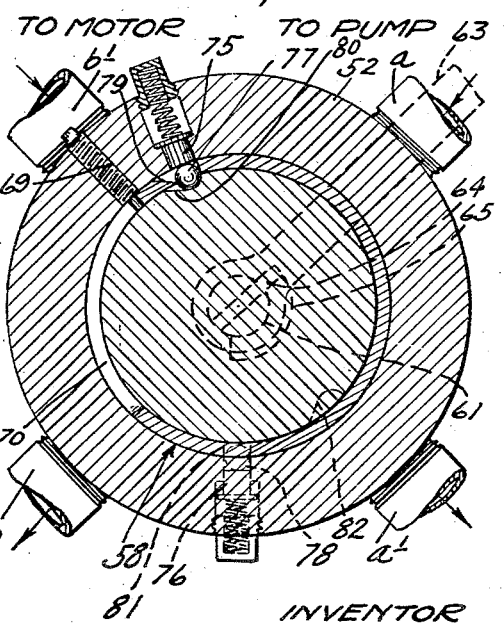

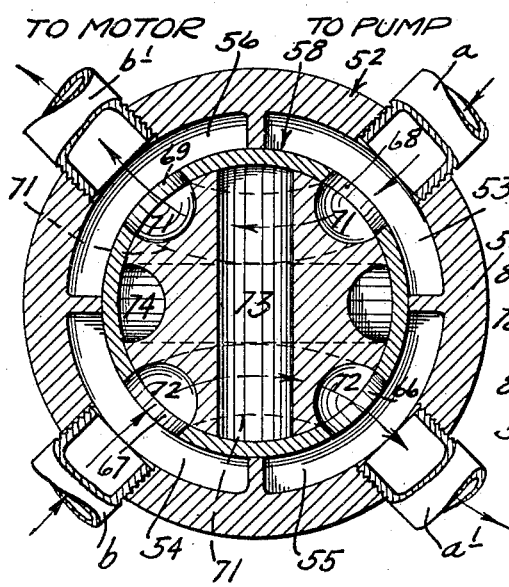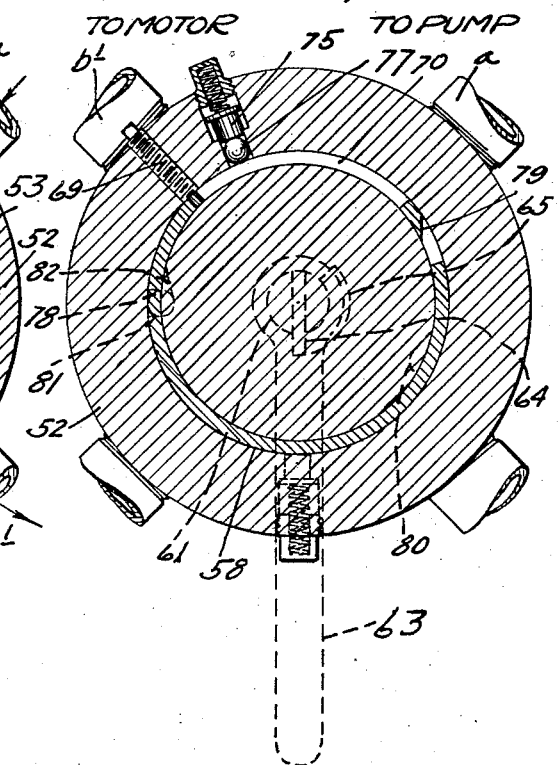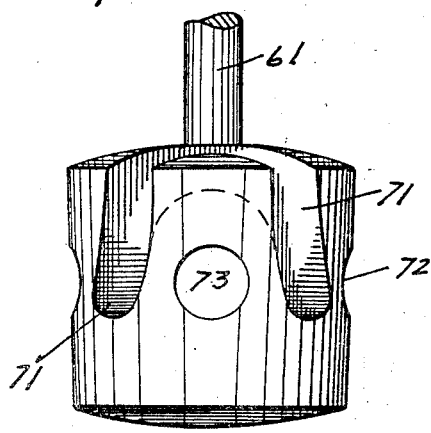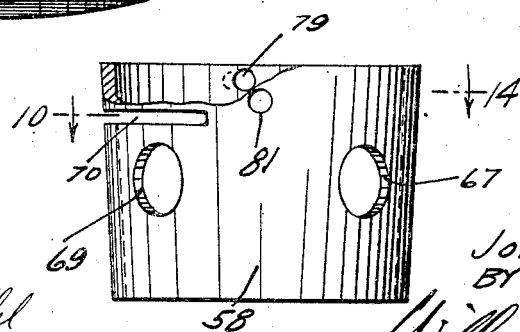

J. RETON.
HYDRAULIC TRANSMISSION MECHANISM.
APPLICATION FILED JULY 19, 1918.

1,343,749.

Patented June 15, 1920.
11 SHEETS—SHEET 9.

WITNESSES
E. C. Wells
A. H. Opsahl

INVENTOR
John Reton
BY HIS ATTORNEYS

J. RETON.
HYDRAULIC TRANSMISSION MECHANISM.
APPLICATION FILED JULY 19, 1918.

1,343,749.

Patented June 15, 1920.
11 SHEETS—SHEET 10.

WITNESSES
E. E. Wells
A. H. Opsahl

INVENTOR
John Reton
BY HIS ATTORNEYS
Williamson Merchant

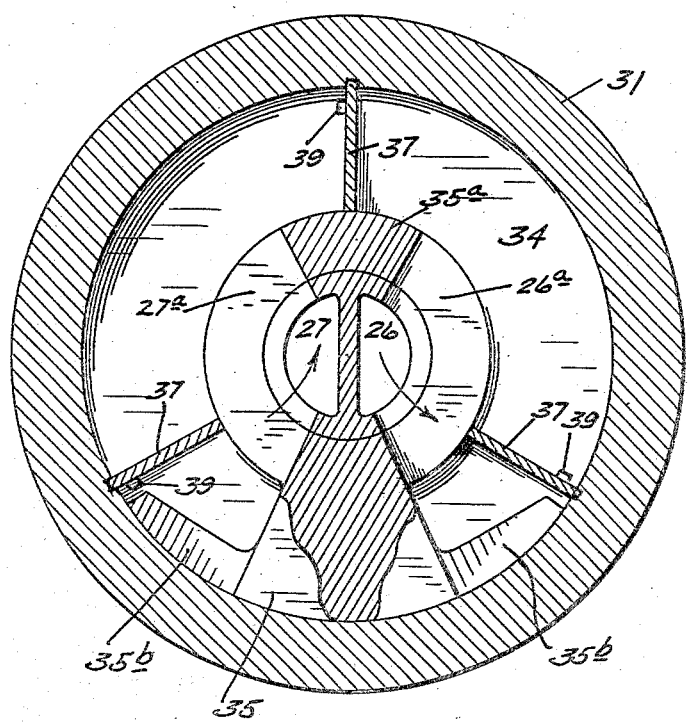

UNITED STATES PATENT OFFICE.

JOHN RETON, OF STEVENS POINT, WISCONSIN.

HYDRAULIC TRANSMISSION MECHANISM.

1,343,749.  Specification of Letters Patent.  Patented June 15, 1920.

Application filed July 19, 1918. Serial No. 245,642.

*To all whom it may concern:*

Be it known that I, JOHN RETON, a citizen of the United States, residing at Stevens Point, in the county of Portage and State of Wisconsin, have invented certain new and useful Improvements in Hydraulic Transmission Mechanism; and I do hereby declare the following to be a full, clear, and exact description of the invention, such as will enable others skilled in the art to which it appertains to make and use the same.

Generally stated, this invention has for its object to provide an improved hydraulic transmission mechanism, and includes an improved rotary motor and controller valve. This motor, so-called, may act either as a driven device operated by fluid forced therethrough, or it may be mechanically driven and then operate to produce a forced circulation of liquid, such as oil. In the improved transmission mechanism, one of the so-called motors will operate as a pump to produce the forced circulation of oil, and the other will operate as a motor proper and will be driven by the oil, the circulation of which is forced by the first noted motor. The two motors may be of the same or of different pumping capacity and they may be of identically the same character or may vary in their details of construction and arrangement. The motor itself may vary in form, and in the drawings, I have illustrated several forms of motor.

In the accompanying drawings which illustrate the invention, like characters indicate like parts throughout the several views.

Referring to the drawings,

Fig. 3 is a transverse vertical section taken on the lines 3—3 of Figs. 1 and 2;

Fig. 4 is a vertical section on the line 4—4 of Fig. 2;

Fig. 5 is a section taken on the line 5—5 of Fig. 2;

Fig. 6 is a detail bottom plan view of the non-rotary motor spindle shown in Fig. 2, some parts being broken away;

Figs. 9, 11 and 13 are horizontal sections taken on the line 9—13 of Fig. 7, but illustrating different positions of the valve elements;

Figs. 10, 12 and 14 are sections through the controller valve taken approximately on the irregular line $x^{10}$—$x^{14}$ of Figs. 7 and 16;

Fig. 15 is a side elevation of the so-called core or oscillating member of the controller valve;

Fig. 16 is a side elevation of the sleeve of the controller valve, some parts being sectioned and some parts being broken away;

Figs. 17 to 20, inclusive, illustrate a modified form of motor; and

Figure 19:
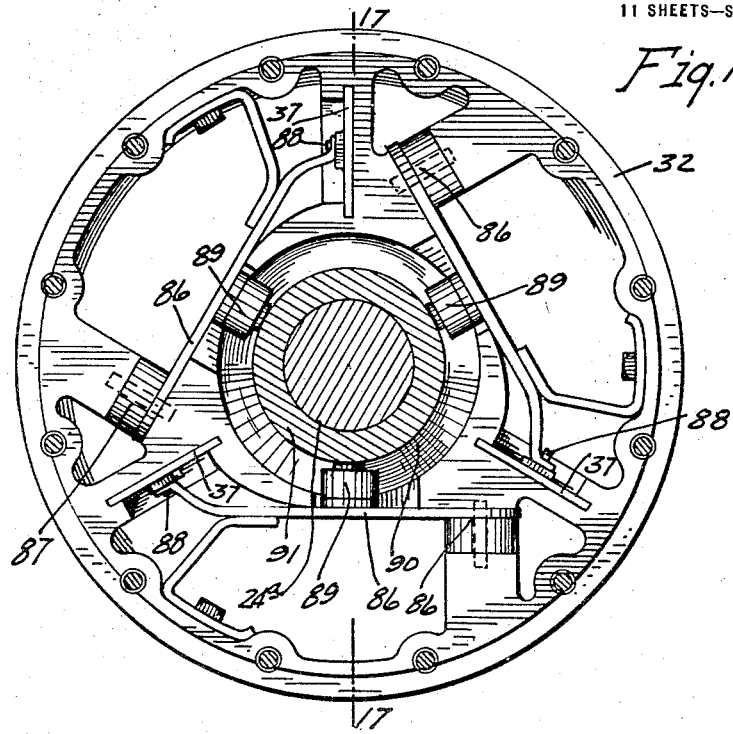
Figure 20:
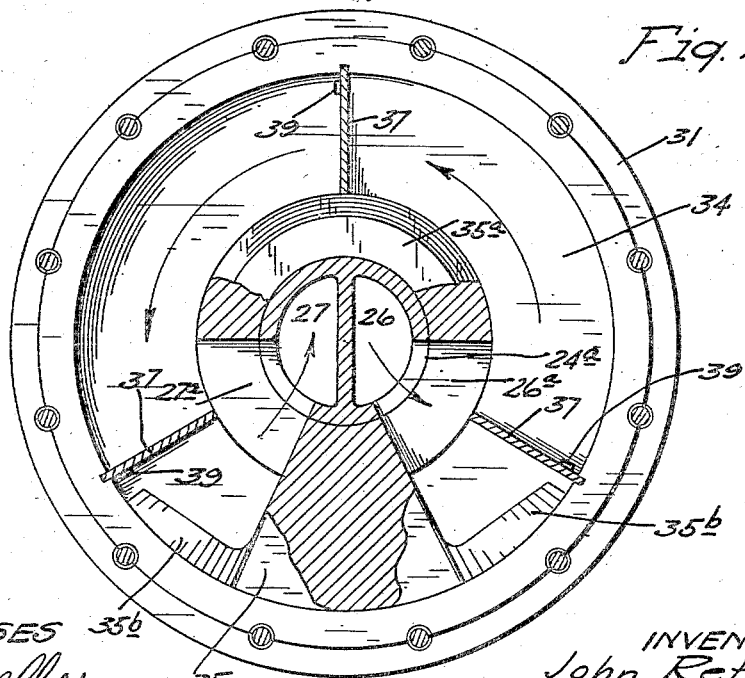
Figure 21:
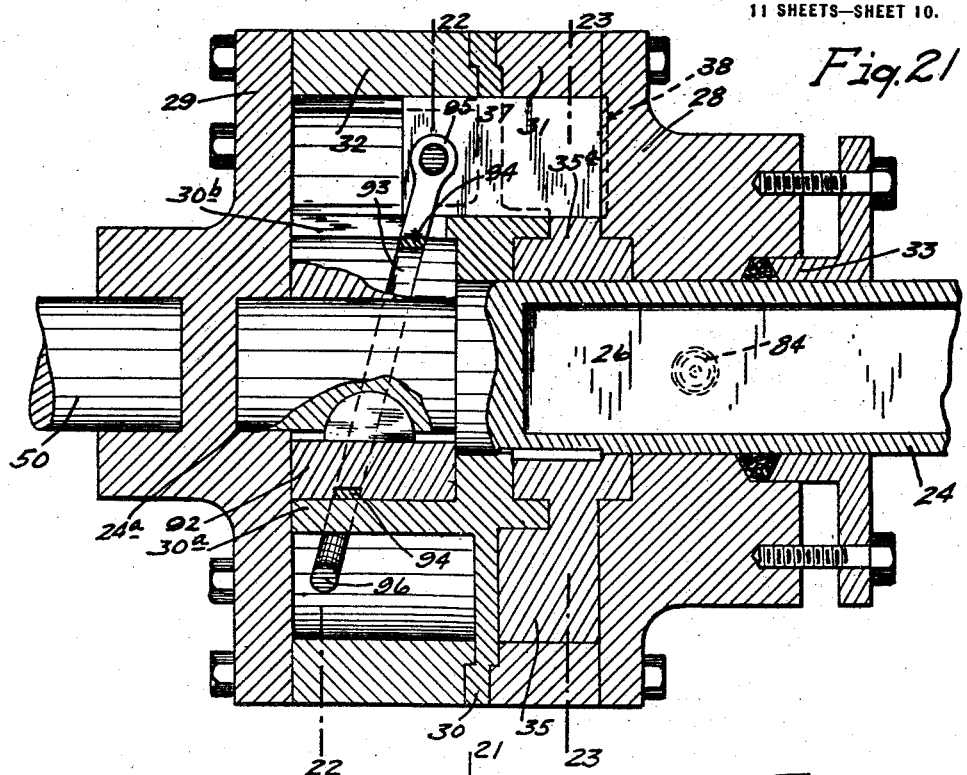
Figure 22:
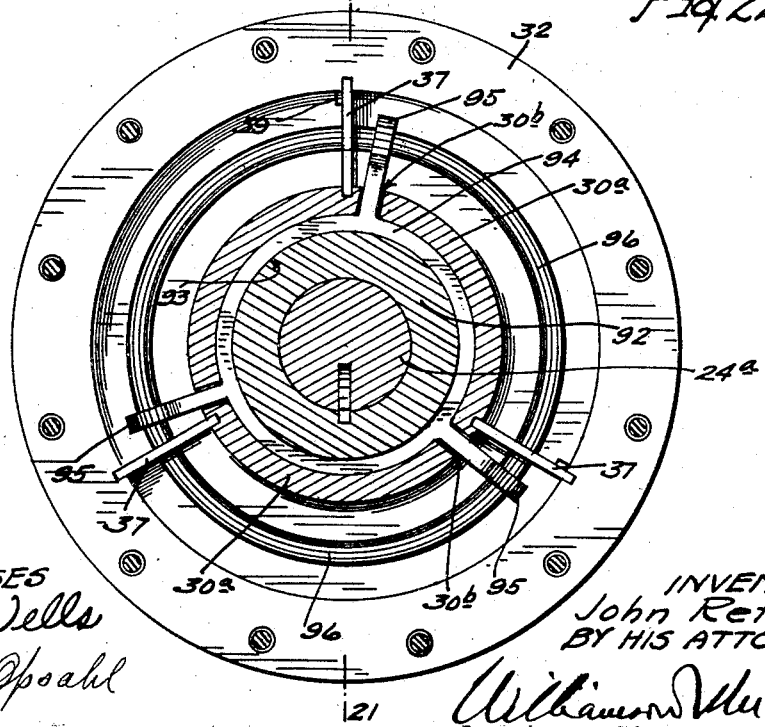

Figs. 21 to 23, inclusive illustrate a still further modified form of the motor;

Fig. 17 is a vertical section taken on the line 17—17 of Fig. 19;

Fig. 18 is a fragmentary section on the line 18—18 of Fig. 17;

Fig. 19 is a section on the line 19—19 of Fig. 17;

Fig. 20 is a section on the line 20—20 of Fig. 17;

Fig. 21 is a vertical section on the line 21—21 of Fig. 22;

Fig. 22 is a section on the irregular line 22—22 of Fig. 21; and

Fig. 23 is a section taken on the line 23—23 of Fig. 21.

We will first consider the construction of the motor illustrated in Figs. 1 to 6, inclusive.

In the preferred arrangement of the motor, the motor casing is arranged to revolve around a fixed axle spindle 24, which, as shown, is fixed at one end to an anchored bearing 25. This spindle 24 is provided with two longitudinal oil ducts 26 and 27, which conduits are closed at both ends.

The motor casing, as shown, is made up of five sections connected to rotate as an entirety or as a single element and comprises sides 28 and 29, a partition plate 30, and an annular spacing ring 31 and spacing block 32. The said members 28, 29, 30 and 32 are journaled directly on the fixed spindle 24. A stuffing box 33 is shown as applied to the hub of the plate 28 forming an oil-tight joint between the said head plate and the fixed spindle. Inside the ring 31 between the head plate 28 and partition 30 is an annular blade chamber or runway 34. Located within this chamber 34 and keyed, or otherwise rigidly secured to the fixed spindle 24 is an anchored abutment 35 that closely fits the interior of the ring 31 and the adjacent faces of the members 28 and 30.

Figure 2:
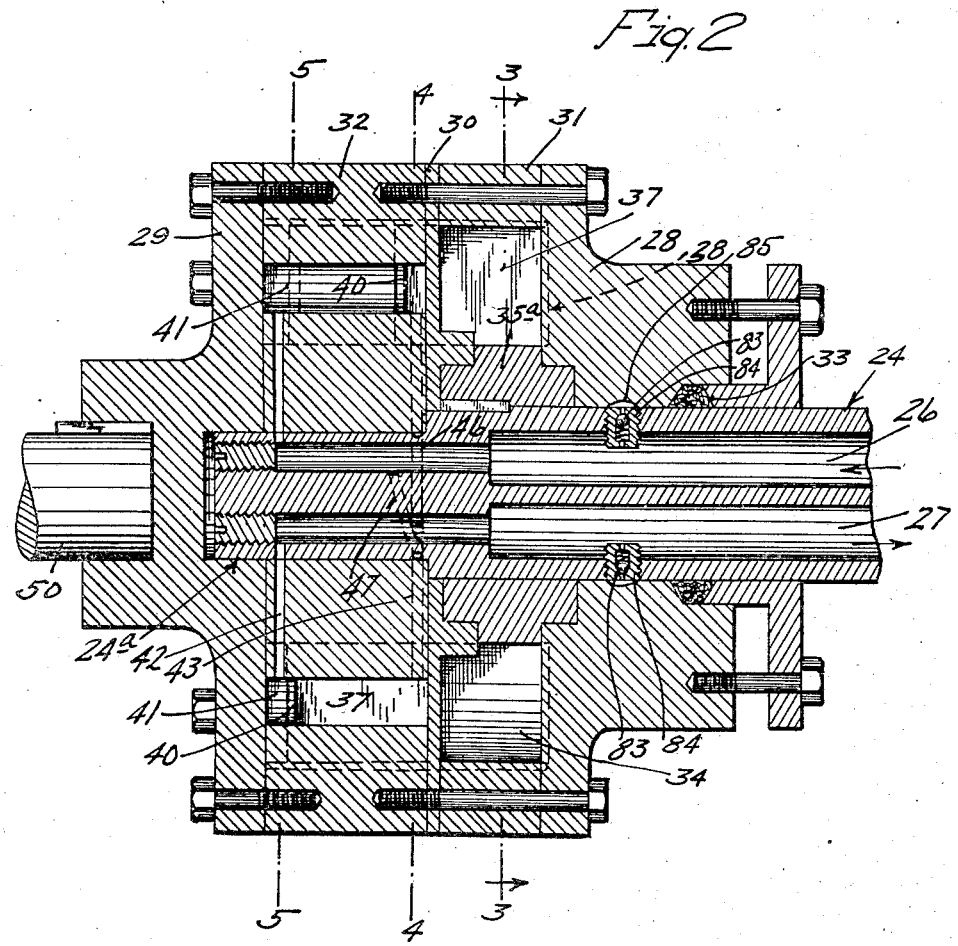
Fig. 2 is a horizontal section taken on the line 2—2 of Fig. 3.

The so-called spacing block or intermediate member 32, which, of course rotates with the casing, is formed with a plurality of radial blade seats 36 (see particularly Figs. 2 and 5, inclusive.) As shown, the said block 32 is provided with but three of these radial blades 36, but it would preferably be provided with a larger number, three being the minimum number permissible. Arranged to slide laterally in the radial blade seats 36 are propeller blades 37. The blade seats 36 also extend through the partition 30, so that the blades 37 can be projected completely across the blade runway 34, or may be retracted toward the left, in respect to Fig. 2 out of said runway and into the block 32 and partition 30. The blades 37 are, of course, of such size that when projected, they will closely fit against the interior of the ring 31, against the hub of the abutment 35 and against the inner wall of the head 28, and preferably, the latter is grooved to afford a recessed seat for the projected ends of said blades (see dotted lines 38, Fig. 2). To prevent trapping of oil within the grooves 38, the latter may have escape ports 39 (see Fig. 3).

The propeller blades 37 on opposite sides are formed with semi-cylindrical piston forming flanges 40 that work in semi-cylinders 41 formed adjacent to the respective blades in the block 32. The semi-cylinders 41, at one end, are closed against the head 29, and at their other ends, are closed against the partition 30. The block 32 is formed with radial ports 42 and 43, there being one port 42 and one port 43 for each blade, and the said ports, at their inner extremities, being arranged to open into both cylindrical sides of the respective cylinders 41, on opposite sides of the inner edges of the corresponding propeller blades 37.

In line with the blade runway or channel 37 are main oil ports 26ª and 27ª that are located on opposite sides of the abutment 35. The port 26ª opens from the oil conduit 26 of the fixed spindle through the hub 35ª of the abutment 35, and the port 27ª opens from the conduit 27 of said fixed spindle through the said hub 35ª. The outer portion of the fixed abutment 35 is segmental, so that it fits the interior of the spacing ring 31 and the said abutment is also preferably provided with oblique segmental cam extensions 35ᵇ that bevel away from the head 28, so that, in emergency, they will have a cam action that will positively retract the blades and cause them to clear the abutment. However, this camming action is not relied upon in the normal action, but other novel means now to be described, is provided for that purpose.

By reference, particularly, to Figs. 2, 4, 5 and 6, it will be noted that the extended end of the spindle 24 is reduced at that portion that affords a journal for the box 32 and head 29. This reduced portion 24ª, in that portion thereof that is covered by the block 32, is formed with substantially radial ports 44, 45, 46 and 47, the latter extremities of which, in Fig. 6, are indicated by solid black to indicate holes. The extremities of ports 44 and 45 are longitudinally positioned for intermittent registration with the radial ports 42 of block 32 and the outer extremities of ports 43 of the said block. The ports 44 and 45 lead, respectively, from the oil ducts 26 and 27 of the spindle 24, while the ports 46 and 47 are crossed and lead, respectively, from the said oil ducts 27 and 26. The exact relative arrangement of the ports above described, in respect to each other, and their timing in respect to the rotation of the casing or rotary member of the pump, will be made clear in the description of the operation thereof.

I will first describe the operation of the above described motor when operating as a simple rotary motor driven by a fluid, such as oil which is positively circulated through the oil ducts 26 and 27 of the fixed spindle 24, and in the first illustration will assume that the oil, under high pressure, is being forced into the oil duct 26 and is finding its return out through the oil duct 27.

By reference to Fig. 3, wherein the casing is being rotated in direction of the arrow marked adjacent thereto it will be observed that the oil, under pressure, from conduit 26, finds its outlet through port 26ª into the annular blade runway or channel 34 just at the right of abutment 35, and hence, is then acting upon the uppermost propeller blade 37 (which latter is then projected into the channel) and positively produces rotation of the said casing in the direction stated. At the same time, it will be noted that the oil head of the uppermost propeller blade 37 which is caged in the left hand side of channel 34, finds ready escape through ports 27ª into conduit 27.

The manner in which the propeller blades 37 are automatically projected into channel 34 and retracted therefrom is as follows: As a particular blade 37 passes the abutment 35, just before it reaches the position at the right in Fig. 4, coöperating port 42 comes into registration with port 44, thereby admitting oil under pressure into the outer end of its divided cylinder 41, and this permits the oil under pressure to act on piston flanges 40 and to quickly and positively shut that blade 37 completely across the blade channel 34. As the casing rotates, the oil will be caged in the said port 42 and will hold that blade projected until it reaches approximately the position shown at the left in Fig. 3, whereupon the said port just noted will be brought into registration with port 45, which then connects the said port 42 back to the channel 27 which is then acting as the return passage of the oil circulating system. Otherwise stated, under the direction of rotation just stated, ports 44 and 45 act, respectively, as admission and exhaust ports for the oil admitted to the left hand end of the divided cylinder 41 and the several blades, as they rotate, are, in succession, projected as just stated, and then open to exhaust. The action just described positively projects the blades and permits, but does not produce, the return movements. Their return movement is produced by a similar action through ports 46 and 47. More specifically stated, at the time the above noted port 44 is brought into registration with port 45, port 43 of the divided cylinder now considered, will be brought into registration with port 46 which leads from channel 27. The corresponding port 43 will be brought into registration with port 46 which leads back to the return channel 27 and thus permits the outward movement of the said blade, as above described. When the said blade reaches approximately its left hand position in Fig. 5, and the noted port 42 is brought into registration with return port 45, as above described, port 47 which leads from oil pressure channel 26 will be in registration with port 43 just noted, so that the blade will then be positively, by high pressure, forced back to its retracted position.

The operation of the motor under the forced circulation of oil driven in one direction, has now been made clear.

The motor has been described as driven in one direction which may be assumed to be the proper direction for causing a vehicle to travel forward by the forced circulation of oil into oil conduit 26 and the return of the oil through conduit 27; and it is, of course, obvious, that when oil is forced under pressure into the conduit 27, and permitted to return through conduit 26, the actions above described will take place in reverse order and the port casing will be driven in a reverse direction from that described, towit, in a direction reverse from a direction indicated by the arrow marked on Fig. 3.

Figure 1:
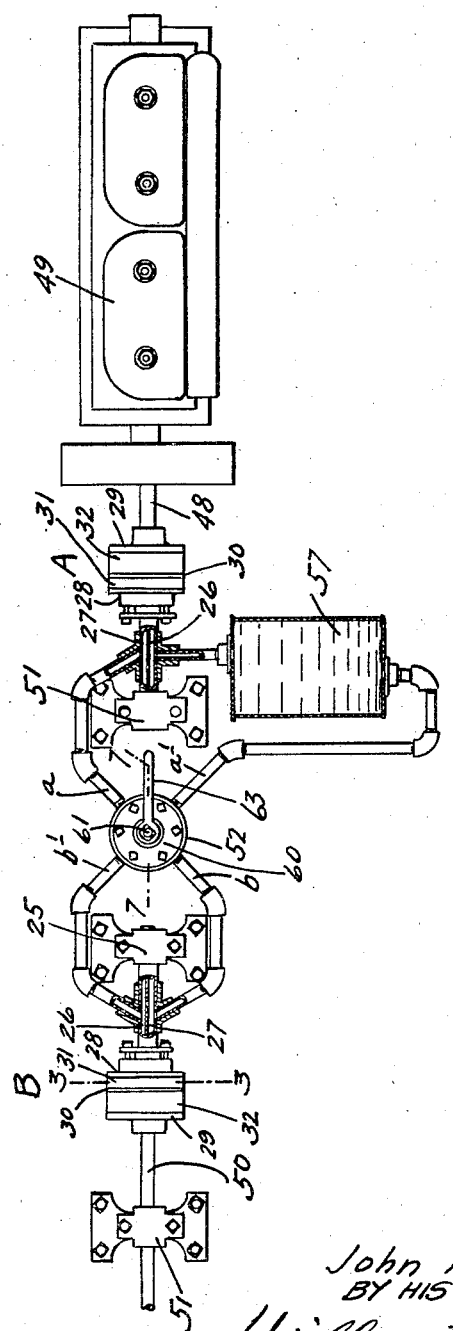
Figure 1 is a plan view with some parts sectioned, illustrating the improved hydraulic transmission mechanism connected into an engine driven transmission shaft and arranged to drive the driven section of said shaft at variable speeds in either direction from the engine driven section of said shaft.

It will, of course, be understood that when the so-called motor is power driven, as by an engine, it will operate as a pump to produce a positive forced circulation of oil. Hence, in my hydraulic transmission system, I employ one of the said motors as a pump and the other as a motor operated as a driven mechanism. Both the driving and driven motors may be considered as of the same construction. In Fig. 1, the driving motor or pump is indicated, as an entirety, by the character A and the driven is indicated as an entirety by the character B. The case of motor A is, as shown, connected to the crank shaft 48 of an internal combustion engine 49, and the casing of motor B is connected to transmission shaft 50, shown as journaled in part in a bearing 51.

The controller valve and the connections between the same and the oil ducts 26 and 27 of the driving and driven motors are preferably as follows:

The numeral 52 indicates a cylinder valve casing which is suitably anchored and on its interior is formed with, but slightly spaced cylindrical ports 53, 54, 55 and 56. Port 53 is connected by a circulating pipe $a$ to oil duct 27 of the fixed spindle of pump acting or driving motor A and port 55 is connected by pipe $a^1$ to conduit 26 of the said fixed spindle of motor A. As shown, and preferably, an oil reservoir 57 is interposed in the circulating pipe $a^1$. This reservoir may be either a closed or an open reservoir but preferably, and as shown, a closed reservoir. This closed reservoir would be especially desirable when the transmission mechanism is used in connection with vehicles such as automobiles.

Port 54 is connected by a circulation pipe $b$ to oil conduit 27 of the fixed spindle of motor B, and port 56 is connected by a circulating pipe $b^1$ to the oil conduit 26 of said fixed spindle of motor B.

Figure 7:
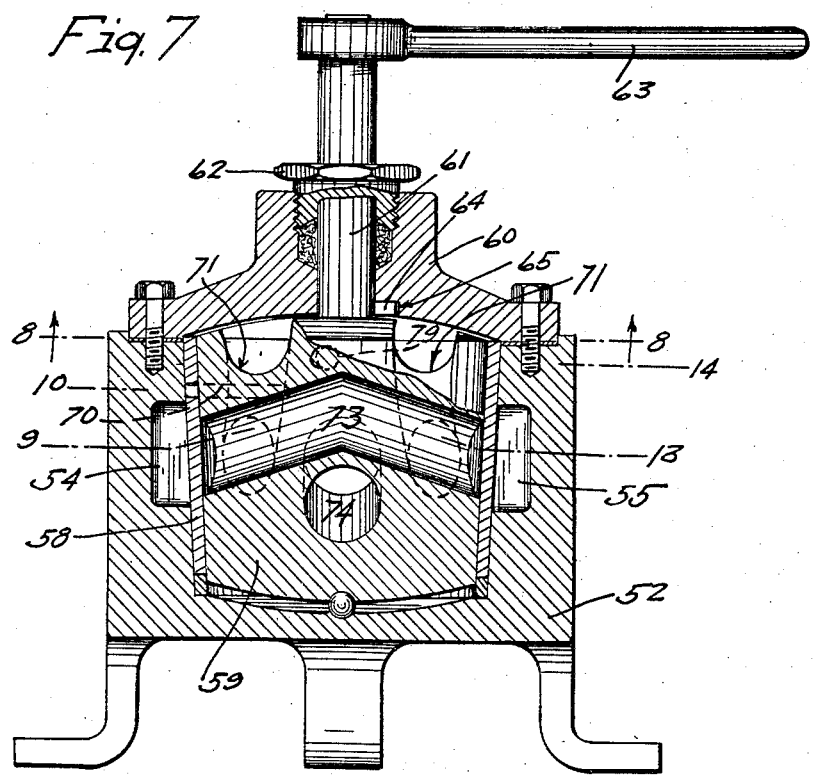
Fig. 7 is a vertical section through the controller valve on the line 7—7 of Fig. 1, showing the said valve on a much larger scale than in Fig. 1.
Figure 8:
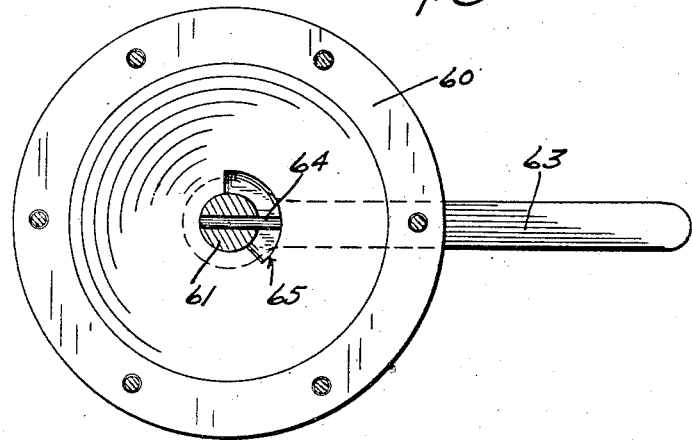
Fig. 8 is a plan view of the controller valve with the cover removed and some parts sectioned on the line 8—8 of Fig. 7.

In addition to the valve casing 52, the controller valve has important elements and comprises a valve sleeve 58 and a so-called valve core 59. The sleeve 58 closely fits and oscillates within the valve casing 52 and the core 59 closely fits within the sleeve 58 and both the said parts 58 and 59 are preferably tapered. The casing 52 has a cover 60 secured thereto with a fluid-tight joint and the valve core 59 has an axial stem 61 that works through a stuffing box 62 on said cover. At its upper end, the stem 61 has an operating handle 63. In the arrangement illustrated, stem 61 has a projecting stop pin 64 that works in a segmental groove 65 (see Figs. 7 and 8). Slot 65 and pin 64 limit the movement of core 59 to approximately 135 degrees.

The valve sleeve 58 has four ports 66, 67, 68 and 69 located circumferentially ninety degrees apart. Movement of sleeve 58 in casing 52 is limited to ninety degrees by a stop screw 69 applied through casing 52 with its end working in a segmental slot 70 of the said sleeve, (see Figs. 10, 12, 14 and 16.)

Valve core 59 has two ports 71 and 72, the extremities of which are circumferentially spaced ninety degrees apart, and it also has two approximately diametrical ports 73 and 74. One extremity of port 73 is midway between the extremities of port 71 and the other extremity is midway between the extremities of port 72. One extremity of port 74 is midway between the opposite extremities of ports 71 and 72. The extremities of all of said ports 71, 72, 73 and 74 are in a proper plane for registration with the above noted ports of sleeve 58, and the ports of said sleeve are always in communication with certain of the ports of the valve casing 52. Of course, the said ports 71, 72, 73 and 74 are so formed in the core that they clear each other and do not communicate.

As an important feature of the valve mechanism, I provide clutch devices of novel construction, and preferably of the following arrangement. Seated in one side of the valve casing 52 is a radially movable spring pressed plunger 75 and seated in the other side of said casing is a similar spring pressed plunger 76. Plunger 75 coöperates with a clutch ball 77 and plunger 76 coöperates with a clutch ball 78. For coöperation with the ball 77, valve sleeve 58 is provided with a radial perforation 79, one side of which is beveled, and for coöperation with this same ball 77, valve core 59 is provided with a ratchet-like notch 80. For coöperation with clutch ball 78, valve sleeve 58 is provided with a single radial perforation 81 and for coöperation with this same clutch ball, valve core 59 is formed with a ratchet-like notch 82. A segmental groove 70 of valve sleeve 58 is in one plane at a right angle to the axis of the valve. Plunger 75, clutch ball 70 perforation 79 and notch 80 are in a plane offset from the first noted plane, and plunger 76, ball 78, perforation 81 and notch 82 are in another plane offset from the first two noted planes.

The operation of the improved valve mechanism designed as described, is as follows:

First note position of the parts of the valve shown in Figs. 9 and 10. In this position of the parts, there is no transmission of oil from the pump acting motor to the driven motor, but the oil on one side of the valve is short circuited through the pump acting motor and the oil on the other side of the valve is short circuited through the driven motor and the latter is free to coast or to remain stationary while the engine and the pump acting motor are in action, or for that matter, while the said engine and pump acting motor are stationary.

To cause the driven motor to be driven in the direction of the arrow on Fig. 3, as above described, a lever 63 of controller valve should be moved ninety degrees, or from the position shown in Fig. 10 into the position shown in Fig. 14, and this moves the valve core and sleeve from the position shown in Fig. 9 into the position shown in Fig. 13, by the following action.

In the position shown in Fig. 10, clutch ball 78 is pressed into engagement with ratchet notch 82 so that when the lever 63 is moved downward, as stated, the ball 78 positively locks sleeve 58 to core 59 and the two elements 58 and 59 then move together until they reach the position shown in Fig. 13. This will cause the oil which is positively pumped from the pump acting motor, to flow from pipe $a$ through valve mechanism and pipe $b^1$ to the driven motor and from the driven motor will permit the oil to return from pipe $b$ through valve mechanism and pipe $a^1$ back to the pump acting motor.

When lever 63 is moved from the position Fig. 14, back into the position shown in Fig. 10, sleeve 58 will move with core 59 because of friction between the same and because the bevel on the beveled side of the notch 82 is at such angle that the sudden force on ball 78 will lightly lock the said two parts 58 and 59 together for common oscillation until they are brought back to the position shown in Fig. 10.

When lever 63 is moved upward forty five degrees from position shown in Fig. 10, or in the position shown in Fig. 12, sleeve 58 cannot move with core 59 because the said sleeve is stopped against movement in that direction by stop screw 69, and hence, the bevel side of notch 83 acting on ball 78, will force said ball radially outward in notch 81 and thereby causes the same to clear the core and permits the said core to freely move and thereby position the same, as shown in Fig. 11. When the core reaches the position shown in Fig. 12, notch 80 comes into registration with ball 77 and spring pressed plunger 75 then forces the said ball inward into said notch and positively locks the core against further movement in that direction. In the position of valve elements shown in Fig. 11, or under pressure from the pump acting motor oil will be delivered from pipe $a$ through pipe $b$ to the driven motor and the return from the said driven motor will be from pipe $b^1$ through pipe $a^1$ and this, as will be noted, will direct the oil through the driven motor in a direction just reverse from that described in connection with the positions of the valve shown in Figs. 13 and 14, so that the motor will then be driven in a reverse direction from the direction indicated by the arrow on Fig. 3.

When lever 63 and core 59 are moved backward from position shown in Fig. 12, to the position shown in Fig. 10, the beveled side of notch 80 will cam ball 77 backward into perforation 79 of sleeve 58, but the said ball will hold said sleeve in a stationary position while the said lever and core are moving from the position shown in Fig. 12 back to the position shown in Fig. 10. Attention is here called to the fact that when lever 63 and core 59 are moved downward from position shown in Fig. 10, or toward position shown in Fig. 14, at which time, as above described, sleeve 58 is positively caused to rotate with said core by ball 78, then the beveled side of perforation 79 will cam ball 77 backward and radially outward into the seat in plunger 75, thereby permitting the said sleeve to move, as stated.

In the motor above described, as an important feature, I preferably provide oil return devices to the oil conduits 26 and 27 of the double spindle 24, (see particularly Fig. 2). Each such so-called oil return device comprises an inwardly opening check valve 83 shown as outwardly spring pressed and mounted in an externally threaded tubular valve casing 84 screwed into the walls of the spindle 24 with its outer extremity alined with internal annular oil groove 85 formed in the hub of the side plate 28 of the revolving motor casing.

With this arrangement, when there is pressure in one of the channels 26—27, the outward escape of oil through the check valve will be prevented, but when one of the said conduits is subject to suction produced by a return of the oil therethrough, such check valve will open and permit the drawing from the channel 85 of such oil as may have leaked into the same between the hub of the said member 28 and the external surface of the fixed spindle 24. This prevents the escape of oil through the packing of the stuffing box 33.

In the form of the motor illustrated in Figs. 17 to 20, inclusive, the construction is the same or may be the same as that already described, but with the ports for producing the reciprocating movements of the proper blades omitted and positively acting cam lever devices substituted therefor. These cam devices only will now be described.

There is one cam lever 86 for each propelling blade 37, and these levers, at one end, are pivoted to internal lugs 87 of the so-called spacing blocks 32. The free ends of said levers 86 are pivotally connected at 88 to the respective propelling blades 37 by suitable means, such as the well known slot and pin connections. At their intermediate portions, the several levers 86 are provided with roller equipped studs 89 that work in a peripheral cam channel 90 of the cam hub 91 that is rigidly secured to the reduced end 24$^a$ of the non-rotary spindle 24. This cam channel 90 is of such form that it operates on the several levers as they are rotated around the same with the motor casing, it will cause the projection and retraction of the respective propelling blades in proper time to clear the abutment 35. In this construction, the propelling blades 37 do not have the piston flanges 40 nor does the block 32 have the cylinder forming grooves 41.

The motor illustrated in Figs. 21, 22 and 23 is like that illustrated in Figs. 17 to 20, inclusive, except that a somewhat different cam device is employed for operating the propelling blades. In this modified construction, the non-rotary cam hub 92, which corresponds closely to the cam hub 91 just described, is formed with an oblique channel 93 in which is mounted a cam-acting collar 94. This cam-acting collar 94 is provided with a plurality of radially projecting arms 95 through the perforated outer ends of which a cam ring 96 is passed. This cam ring is also passed through perforations in the propeller blades 38. In this construction, the spacing plate 30 is formed with a projecting sleeve 30$^a$ that has longitudinal slots 30$^b$ in which the respective arms 95 are arranged to work freely, but by which the said arms and cam collar 94 are caused to rotate with the motor casing. With this construction, when the motor casing is rotated and the cam hub 92 is, of course, held stationary, the movement of the cam collar 94 in the cam channel 93 will cause the arms 95, acting through the ring 96, to reciprocate the propeller blades 37 laterally with a timed action that will cause the same to clear the abutment 35.

In respect to all of the several modified forms of motor described, attention is called to the fact that any desired number in excess of three propeller blades may be employed; and preferably, a larger number would be employed and the number would determine somewhat on the size and character of the motor, but for ordinary constructions, I would advise the use of about six propeller blades. In the preferred arrangement illustrated in the drawings, the so-called abutments of the motor and the spindle, through which the oil is delivered to the motor and conveyed from the motor, are non-rotary, and the motor casing, with its propeller blades, are arranged to revolve around said spindle; but it would, of course, be within the scope of my invention to reverse this construction, that is, to anchor the motor casing against rotation and to cause the spindle and abutment to rotate.

The circumferential elongated ports 53 of the controller valve are always open, or in communication with either the complete main circuit or the by-pass or short circuit, and hence, there can be no locking of the propeller blades of the motors while they are projecting into the runways. In this improved system, there is no probability of trapping of the oil or fluid transmitting material, since the circuits are always open to one course or the other. This prevents breakage and shocks due to what is known as "hydraulic hammer." Obviously, by-passing more or less of the fluid through the local or short circuits, the speed at which the driving motor or pump will drive the driven motor, may be varied at will.

What I claim is:

1. A motor of the kind described comprising a spindle, a motor casing revoluble around the axis of said spindle and having an internal annular blade channel, an abutment anchored to said spindle and projecting into said blade channel, a plurality of propeller blades carried by said casing and movable laterally into and out of said blade channel, said spindle having longitudinal oil ducts and said spindle and casing having coöperating ports operating alternately as admission and exhaust ports for connecting said conduits to spaces of said blade channel between said propeller blades and the opposite faces of said abutment.

2. A motor of the kind described comprising a spindle, a motor casing revoluble around the axis of said spindle, an abutment on said spindle, propeller blades carried by the said casing and movable into and out of propelling coöperation in respect to said abutment, said spindle and casing having coöperating ports controlling the circulation of oil to and from spaces between said abutment and propeller blades, said propeller blades and casing having, respectively, piston and cylinder acting elements and said spindle and casing having coöperating ports leading to and from said oil conduits for automatically projecting and retracting said propeller blades by fluid pressure.

3. A motor of the kind described, comprising a spindle, a motor casing revoluble around the axis of said spindle and having an internal annular blade channel, an abutment anchored to said spindle and projecting into said blade channel, a plurality of propeller blades carried by said casing and movable laterally into and out of said blade channel, said spindle having longitudinal oil ducts and said spindle and casing having coöperating ports operating alternately as admission and exhaust ports for connecting said conduits to spaces of said blade channel between said propeller blades and the opposite faces of said abutment, said propeller blades and casing having, respectively, piston and cylinder acting elements and said spindle and casing having coöperating ports leading to and from said oil conduits for automatically projecting and retracting said propeller blades by fluid pressure.

4. A motor of the kind described comprising a spindle, a motor casing revoluble around the axis of said spindle and having an internal annular blade channel, an abutment anchored to said spindle and projecting into said blade channel, a plurality of propeller blades carried by said casing and movable laterally into and out of said blade channel, said spindle having longitudinal oil ducts and said spindle and casing having coöperating ports operating alternately as admission and exhaust ports for connecting said conduits to spaces of said blade channel between said propeller blades and the opposite faces of said abutment, and automatic means for projecting and retracting said propeller blades to cause said blades to coöperate with and clear said abutment.

5. A motor of the kind described, comprising a spindle, a motor casing revoluble around said spindle and provided with an internal annular blade channel, an abutment anchored to said spindle and working within said blade channel, propeller blades carried by said casing and movable laterally into and out of said blade channel for coöperation with said abutment in the propelling action, said spindle, on opposite sides of said abutment, having ports and said casing having ports coöperating with said spindle ports and operating alternately for admission and discharge of the motive fluid, said spindle having fluid circulating conduits leading to the said two ports thereof, and means for automatically projecting said blades into and out of said blade channel with actions timed to clear said abutment.

6. A motor of the kind described, comprising a spindle, a motor casing revoluble around said spindle and provided with an internal annular blade channel, an abutment anchored to said spindle and working within said blade channel, propeller blades carried by said casing and movable laterally into and out of said blade channel for coöperation with said abutment in the propelling action, said spindle, on opposite sides of said abutment, having ports and said casing having ports coöperating with said spindle ports and operating alternately for admission and discharge of the motive fluid, said spindle having fluid circulating conduits leading to the said two ports thereof, said propeller blades and casing having coöperating piston and cylinder-acting elements and said cylinder, and means having ports arranged to alternately connect the said two fluid circulating conduits to the opposite ends of the piston acting elements of said casing, whereby said propeller blades, by fluid pressure, will be automatically projected into said channel for driving coöperation with said abutment and will be retracted to clear said abutment.

7. In a fluid pressure transmission system, the combination with two motors, one of which is power driven and acts as a pump and the other of which is fluid pressure driven from said pump acting motor, of a controller valve comprising a casing, a sleeve within said casing and a valve core within said sleeve, the latter having a connection for operating the same, a clutch connection between said valve core and sleeve, said sleeve having less movement than said valve core, and said valve casing, sleeve and core having coöperating ports for controlling the flow of motive fluid.

8. In a fluid pressure transmission system, the combination with two motors, one of which is power driven and acts as a pump and the other of which is fluid pressure driven from said pump acting motor, of a controller valve comprising a casing, a sleeve within said casing and a valve core within said sleeve, the latter having a connection for operating the same, a clutch connection between said valve core and sleeve, said sleeve having less movement than said valve core, and said valve casing, sleeve and core having coöperating ports for controlling a flow of motive fluid, one position of said sleeve and core serving to short circuit the flow of motive fluid through the two motors and the other positions thereof serving to direct the flow of motive fluid in either direction through said driven motor.

9. In a fluid propelled motor, the combination with a spindle, of a propeller casing rotatable around said sleeve, said spindle having an abutment and said casing having propeller blades coöperating with said abutment, said spindle having longitudinal fluid conduits and said spindle and casing having coöperating ports connecting the said conduits alternately for the admission and discharge of the motive fluid to and from the spaces between said abutment and propeller blades, fluid return passages opening from said two conduits to the external journal surface of said spindle, the said case in its hub having an internal channel surrounding the outer extremities of said return passages, and intermediate opening check valves in said fluid return passages.

10. In a fluid propelled motor, the combination with a spindle, of a propeller casing rotatable around said sleeve, said spindle having an abutment and said casing having propeller blades coöperating with said abutment, said spindle having longitudinal fluid conduits and said spindle and casing having coöperating ports connecting the said conduits alternately for the admission and discharge of the motive fluid to and from the spaces between said abutment and propeller blades, fluid return passages opening from said two conduits to the external journal surface of said spindle, the said case in its hub having an internal channel surrounding the outer extremities of said return passages, and intermediate opening check valves in said fluid return passages, the hub of said casing having a stuffing box surrounding the journal of said spindle outward of said check valve equipped return passages.

In testimony whereof I affix my signature in presence of two witnesses.

JOHN RETON.

Witnesses:
  F. E. BOYER,
  WM. MOLL.